Patented May 22, 1945

2,376,504

UNITED STATES PATENT OFFICE 2,376,504

ESTER GUMS FROM POLYALLYL ALCOHOL

Harry Fred Pfann, Greenwich, and Edward L. Kropa, Old Greenwich, Conn., assignors to American Cyanamid Company, New York, N. Y., a corporation of Maine No Drawing. Application October 23, 1942, Serial No. 463,116

6 Claims. (Cl. 260—27)

This invention relates to ester gums of unusually high softening points. The invention includes the new ester gums themselves, their methods of manufacture, and varnishes, paints, printing inks and other finished compositions containing them.

The esters of rosin and rosin acids with polyhydric alcohols are known commercially as ester gums, and are used in the formulation of paints, varnishes and similar resinous compositions. It is an object of our invention to prepare ester gums having higher softening points and improved hardness, as compared with those now in commercial use, by esterifying abietic acid or rosin acids with polyallyl alcohols.

We have found that polyallyl alcohols can be esterfied with abietic acid or rosin acids to produce esters of relatively low acid number having an unusually high softening point and considerably greater hardness than the corresponding esters of these acids with glycerine. In the present specification and claims the term "polyallyl alcohol" means the material obtained by polymerizing allyl alcohol by any suitable method such as by the action of ultraviolet light, or by subjecting the alcohol to the influence of oxygen at elevated temperatures and preferably at superatmospheric pressures until substantial proportions of the alcohol have been polymerized. The polymer of allyl alcohol is theoretically a straight chain polyhydric alcohol having a hydroxyl value of the same order of magnitude as unpolymerized allyl alcohol itself, although in most commercial samples it will be found that the hydroxyl value is somewhat lower due to side reactions occurring during the polymerization procedure. On the basis of the increase in specific gravity and index of refraction as well as the iodine value, which decreases with increasing molecular weight, we estimate that the polyallyl alcohols have a degree of polymerization of about 5 to 11 or more; in other words, that each molecule of the polymerized alcohols contains from 5 to 11 or more reactive hydroxyl groups. This explains the hardness and usually high melting points of their low acid number esters with abietic acid and rosin acids.

The characteristics of the polyallyl alcohols are described in detail in our copending application Serial No. 413,684, filed October 4, 1941, of which the present application is a continuation in part. They are preferably prepared from monomeric allyl alcohol free from antioxidants such as hydroquinone or other inhibitors, and we therefore prefer to use allyl alcohol which has been purified by distillation after adding an alkali such as NaOH, KOH or CaO. Allyl alcohol purified in this manner polymerizes quite readily.

Polyallyl alcohols containing from 5 to 11 or more hydroxyl groups per molecule, which are the preferred polyallyl alcohols for esterification with abietic acid or rosin acids to form the improved ester gums of the present invention, are preferably prepared by heating monomeric allyl alcohol with oxygen. The polymerization may be carried out by heating the monomeric alcohol to its boiling point under a reflux condenser and passing a steady stream of oxygen through the liquid for several days or the allyl alcohol may be placed in an oxygen bomb under an initial pressure of several atmospheres of pure oxygen and heated to temperatures on the order of 100° C., for about 3-8 hours. In either case the polymerized alcohol may be purified from monomeric alcohol and other impurities of lower boiling point by distillation.

As a starting material for the preparation of the new esters of the present invention we may employ pure abietic acid or a commercially pure grade of this material such as may be obtained from talloel. However, the most important esters for use in the preparation of paints, varnishes and printing inks are preferably those obtained by esterifying polyallyl alcohols with rosin, such as gum rosn, wood rosin, hydrogenated rosin and the like, since rosin is probably the cheapest source of abietic acid. We have found that polyallyl alcohols esterify easily with rosin to produce ester gums of good color, as well as hardness and unusually high softening point. These ester gums are well suited for the preparation of varnishes by cooking with oils such as linseed oil, soya bean oil and the like. They can be dissolved or dispersed in tung oil, oiticica oil and the like by slowly adding these oils to the molten resin with continued heating and agitation or by first heating the resin with linseed oil and then adding the faster drying varnish oils to the resulting solution. Resins suitable for sizing textiles can be prepared by hydrogenating the polyallyl polyabietates at elevated temperatures and pressures in the presence of finely divided nickel or other catalysts.

By reason of the unusual hardness and high softening point of the ester gums of the present invention they are well suited for use in admixture with ordinary abietic acid-glyceride ester gum in varnish formulations. They may also be used in admixture with the abietic acid esters or rosin esters of pentaerythritol or dipentaerythritol, or with phenol-formaldehyde hardened rosin-glyceride ester gums and the like. Such mixtures may be physical blends of the various ester gums, or they may be prepared by employing mixtures of glycerine, pentaerythritol, dipentaerythritol or any other suitable polyhydric alcohol with polyallyl alcohol for esterification of the rosin. Our invention in its broader aspects therefore includes the abietic acid or rosin acids with polyallyl alcohols in admixture with glycerine or other polyhydric alcohols containing a smaller number of esterifiable hydroxyl groups.

The products obtained by esterifying polyallyl alcohol with abietic acid or with rosin are clear, hard brittle solids having softening points greater than 130° C. When properly prepared they have relatively low acid numbers, which range from about 20 to about 30, and are soluble in cold toluene and in hot high-boiling petroleum fractions sold commercially as "Sunoco Spirits."

The preparation of an ester gum from rosin and polyallyl alcohol is described in the third of the following specific examples. Although this example describes in detail the preparation of one polyallyl polyabietate, it should be understood that exactly the same procedure in preparing any other ester of a polyallyl alcohol with abietic acid or rosin, merely by varying the ratio of the alcohol to the acid. This example should therefore be regarded as illustrative of the method of preparation of all the esters of our invention.

Example 1

685 parts by weight of a sample of allyl alcohol which had been purified by distillation from NaOH, having a refractive index of $N_D^{25} = 1.4110$, was placed in a vessel fitted with reflux condenser and a sintered glass diffusing plate located at the bottom. The alcohol was heated to its refluxing point and a steady stream of oxygen passed through the liquid. Heating and oxygen blowing was continued for 5 days at which time the reaction mixture was a clear, yellow-colored, slightly viscous syrup.

A portion of this reaction mixture was freed of volatile matter by heating on a steam bath under a pressure of 5-10 mm. From 220 parts of syrup there are obtained 99 parts of an almost water-white heavy balsam. As the product had a higher specific gravity and index of refraction than the original alcohol it was apparent that polymerization had taken place. The balsam had an iodine value of 39.4 and since monomeric allyl alcohol has a theoretical iodine value of 438 the degree of polymerization of the product was 11.1, which corresponds to a polymer having a molecular weight of at least 634. Further examination of the product showed that it had a hydroxyl number of 598. As analytically determined hydroxyl values of complex compounds are generally lower than their theoretical values the found value of 598 indicates that a very large proportion of the polymer is constituted of combined allyl alcohol radicals. The balsam also had an acid number of 22.6 and an ester number of 60 thus indicating the presence of small amounts of acid and ester structures in the polymeric material, which structures might result from the presence of free acids or esters or possibly the presence of small amounts of copolymers having acid and/or ester groupings.

Example 2

50 parts of monomeric allyl alcohol which had been purified by prolonged refluxing with calcium oxide followed by distillation was placed in an oxygen bomb and subjected to a temperature of 100° C. and a pressure of approximately 132 pounds per square inch. After an induction period of about 30 minutes the pressure in the bomb started to fall rapidly. After about 3 hours' time the pressure in the bomb remained steady at about 40 pounds per square inch. A similar sample of alcohol which had been purified by distillation from solid NaOH behaved in the same manner whereas a sample which been been purified by simple distillation of the alcohol required an induction period of 60–70 minutes before an appreciable oxygen absorption was observed. These products were all light-colored viscous syrups of increased specific gravity and having an increased index of refraction as in the preceding examples.

Example 3

300 parts by weight of W. W. gum rosin and 90 parts of polyallyl alcohol prepared as described in Example 1 and having a molecular weight of 634 were heated together slowly to 250° C. As soon as the rosin had melted a mechanical stirrer was introduced and a stream of $CO_2$ was bubbled through the mixture. The water formed was allowed to separate through a tube provided for the purpose. After 12 hours' heating at about 250° C. the acid number of the reaction mixture was 25, and it remained at this value even after further heating. The hot liquid was poured upon a metal tray where it quickly solidified and was then broken up and stored in a closed bottle.

The polyallyl abietate was obtained as a hard brittle solid having a softening temperature of 139° C. when tested by the A. S. T. M. ball and ring method. The color of a 50% toluene solution of the ester gum was 15 on the Hellige-Klett scale. It was soluble in cold toluene but insoluble in cold Sunoco Spirits, although it dissolved in the latter solvent upon heating. When equal parts by weight of the ester gum and K. V. O. linseed oil were heated together there was obtained a clear orange solution which remained clear on cooling to room temperature.

Example 4

The ester gum described in the preceding example was incorporated into a varnish and evaluated by comparison with a pentaerythritol abietate ester gum sold commercially as "Pentalyn" and an ordinary abietic acid triglyceride sold commercially as "Ester Gum 6–S."

Varnishes were made on the basis of 100 pounds of resin to 15 gallons of oil. The "Ester Gum 6–S" and "Pentalyn" varnishes were prepared by heating a dehydrated castor oil known commercially as "Isoline S–V" to 585° F. and holding for a slight string off the thermometer. In each case the ester gum resin was then added as a check. The temperature was raised to 450° F. at which point both resins were in solution and the batches were removed from the fire and reduced with mineral spirits to 50% solids.

The polyallyl ester gum was insoluble in "Isoline S–V," and a modified procedure was necessary. The polyallyl ester gum was therefore heated to 500° F. with KPO-Q linseed oil in the ratio of 100 pounds of the resin to 7.5 gallons of oil. 7.5 gallons of "Isoline S–V" were preheated to 450° F. and added to the resin solution after which the entire batch was heated to 585° F. and held for a viscosity of A in a 50% solution in hot mineral spirits.

Driers in the amounts of 0.3% Pb and 0.03% Co as metal to oil were added to the above varnishes and drying tests were made. The varnishes were flowed on steel panels and dried as follows:

| | Resin | Time in hours | | | | | | | |
|---|---|---|---|---|---|---|---|---|---|
| | | 1 | 2 | 3 | 4 | 5 | 6 | 7 | 24 |
| 1 | Polyallyl ester gum | 2 | 5 | 7 | 9 | 10 | | | |
| 2 | Ester gum 6-S | [1]1 | 2 | 3 | 5 | 6 | 8 | 9 | 10 |
| 3 | Pentalyn ester gum | 2 | 5 | 7 | 8 | 9 | 10 | | |

[1] 1=not set; 10=set and tack-free.

The polyallyl ester gum gave the fastest dry followed by the "Pentalyn"; the standard ester gum gave the poorest drying test and required 24 hours to become tack-free.

After air drying for 5 days, the varnish films were immersed in water for 20 hours. The polyallyl ester gum resin varnishes showed only slight whitening and softening and were the best of the group.

What we claim is:

1. An ester gum of low acid number and high softening point comprising the reaction product of abietic acid and polyallyl alcohol containing at least 5 reactive hydroxyl groups.

2. An abietate of polyallyl alcohol containing at least 5 reactive hydroxyl groups.

3. A rosin ester of polyallyl alcohol containing at least 5 reactive hydroxyl groups.

4. A rosin ester of a polyallyl alcohol containing from 5 to about 11 reactive hydroxyl groups, said ester having a low acid number and a high softening point.

5. A method of producing an ester gum having a high softening point which comprises heating a material rich in abietic acid with polyallyl alcohol containing at least 5 reactive hydroxyl groups and continuing the heating at elevated temperatures until an ester gum of low acid number is formed.

6. A method of producing an ester gum having a high softening point which comprises heating together rosin and polyallyl alcohol containing at least 5 reactive hydroxyl groups and continuing the heating at elevated temperatures until an ester gum of low acid number is formed.

HARRY FRED PFANN.
EDWARD L. KROPA.